(12) United States Patent
Russ et al.

(10) Patent No.: US 8,032,832 B2
(45) Date of Patent: Oct. 4, 2011

(54) NON-LINEAR PRESENTATION CANVAS

(75) Inventors: Victor Kevin Russ, Bellevue, WA (US);
Ian Michael Sands, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 12/107,058

(22) Filed: Apr. 21, 2008

(65) Prior Publication Data

US 2009/0265632 A1 Oct. 22, 2009

(51) Int. Cl.
*G06F 3/048* (2006.01)

(52) U.S. Cl. ........ 715/731; 715/730; 715/716; 715/781; 715/769; 715/205

(58) Field of Classification Search .................. 715/716, 715/719, 727, 730, 731, 732, 733, 762, 764, 715/765, 781, 810, 205; 725/135, 136
See application file for complete search history.

(56) References Cited

U.S. PATENT DOCUMENTS

| | | | |
|---|---|---|---|
| 5,675,752 A | 10/1997 | Scott et al. | |
| 6,121,963 A * | 9/2000 | Ange | 715/202 |
| 7,036,076 B2 | 4/2006 | Anwar | |
| 7,075,513 B2 | 7/2006 | Silfverberg et al. | |
| 2002/0044683 A1* | 4/2002 | Deshpande et al. | 382/165 |
| 2002/0059604 A1* | 5/2002 | Papagan et al. | 725/51 |
| 2002/0062403 A1* | 5/2002 | Burnett et al. | 709/318 |
| 2003/0061284 A1* | 3/2003 | Mandarino et al. | 709/204 |
| 2003/0172174 A1* | 9/2003 | Mihalcheon | 709/231 |
| 2004/0034622 A1* | 2/2004 | Espinoza et al. | 707/1 |
| 2004/0267701 A1 | 12/2004 | Horvitz et al. | |
| 2005/0138570 A1 | 6/2005 | Good et al. | |
| 2006/0132507 A1 | 6/2006 | Wang | |
| 2006/0184872 A1 | 8/2006 | Dontcheva et al. | |
| 2007/0074268 A1* | 3/2007 | Pepper et al. | 725/136 |
| 2008/0195981 A1* | 8/2008 | Pulier et al. | 715/974 |

FOREIGN PATENT DOCUMENTS

SE WO02061682 A1 8/2002

OTHER PUBLICATIONS

Cathy, et al., "Mindshift Innovation", Oct. 4, 2007, pp. 2.
Good, et al., "CounterPoint: Creating Jazzy Interactive Presentations", Technical Report HCIL-2001, pp. 9.
"Datapoint", Version 1.1, 1997-2007, FileDudes.com, pp. 2.
Shaw, "Create Pan and Zoom Effects in PowerPoint", 2007, Microsoft Corporation, pp. 10.
"Free PhotoMesa 3.11 (Windows)", retrieved on Dec. 28, 2007 at <<http://www.windsorinterfaces.com/photomesa.shtml >>, Windsor Interfaces Inc., pp. 3.

* cited by examiner

*Primary Examiner* — Xiomar L Bautista
(74) *Attorney, Agent, or Firm* — Hope Baldauff Hartman, LLC

(57) ABSTRACT

Technologies are described herein for providing a non-linear presentation canvas. A non-linear presentation canvas is provided. The non-linear presentation canvas is a virtual space onto which multimedia files and hyperlinks can be inserted. A content preview for one or more of the multimedia files and hyperlinks inserted onto the non-linear presentation canvas is displayed. The content preview is selectable to display the corresponding multimedia files and hyperlinks during a presentation.

17 Claims, 11 Drawing Sheets

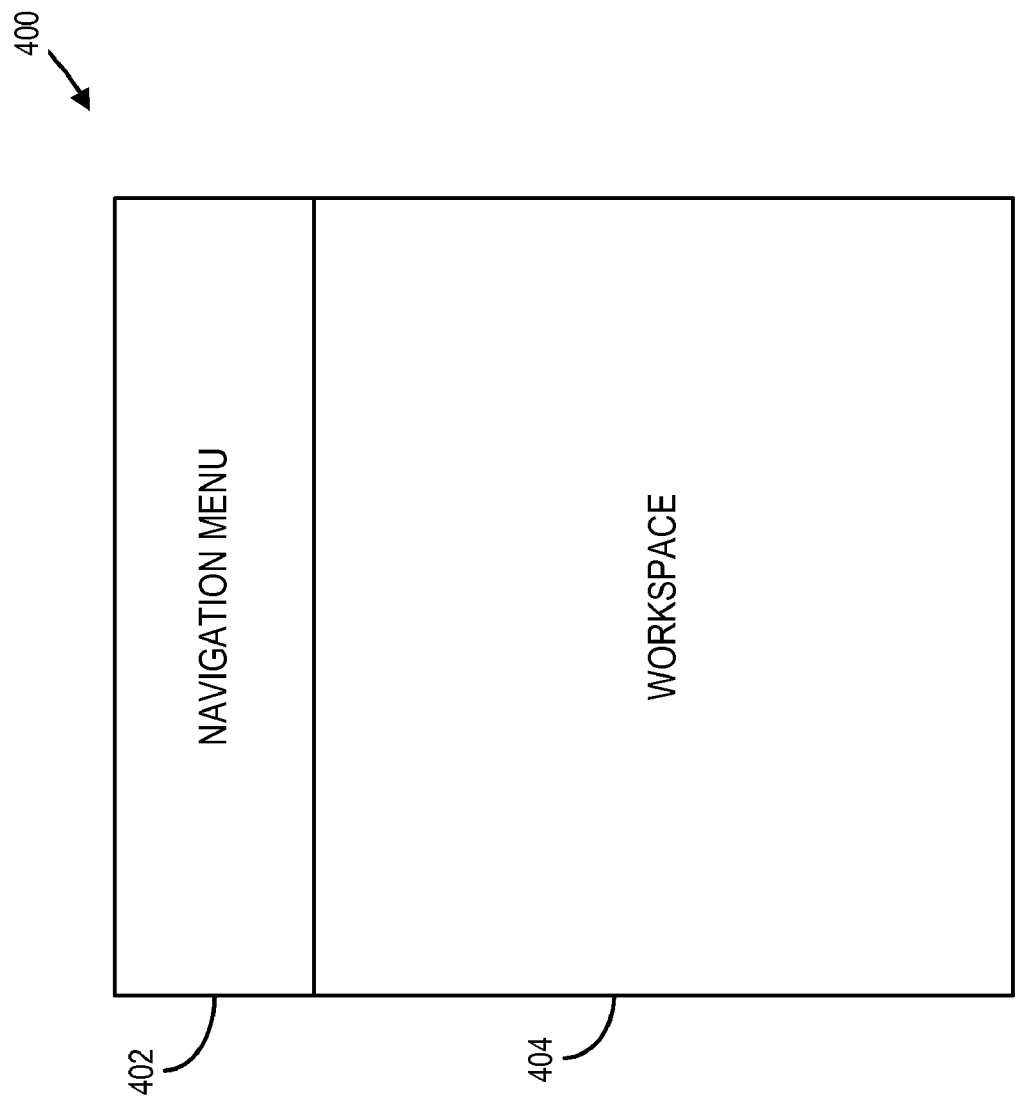

NON-LINEAR PRESENTATION CANVAS

BACKGROUND

Prior to the availability of presentation applications, such as POWERPOINT from MICROSOFT CORPORATION and KEYNOTE from APPLE INC., users often relied on printed materials or manual writing surfaces to supplement an oral lecture. Examples of printed materials include handouts, pamphlets, overhead transparencies, posters, charts, photographic slides, and the like. Examples of manual writing surfaces include chalkboards, whiteboards, and the like.

These early presentation mediums had a number of drawbacks. For example, an audience may have difficulty focusing on a speaker while reading the handouts. Further, generating pamphlets, posters, charts, and photographic slides may be cost prohibitive, especially when the presentation is given in a limited number. With manual writing surfaces, the audience may be focused on taking notes, instead of listening to the speaker. Also, the effectiveness of manual writing surfaces depends heavily on the handwriting skills of the speaker.

The advent of presentation applications has provided users with the ability to generate and display rich presentations embedded with text, graphics, and other multimedia content. A conventional presentation application provides an editor interface for generating a presentation and a slideshow interface for displaying the presentation. A conventional editor interface provides a blank template containing multiple slides. The user can insert text, graphics, sound, and other multimedia into the slides via the editor interface. The slides can then be displayed via the slideshow interface in a linear presentation flow. For example, common operations for traversing slides in the presentation include "next slide" for viewing the next slide in a predefined sequence and "previous slide" for viewing the previous slide in the predefined sequence.

In conventional presentation applications, the content inserted into the slides is generally limited to the size of the slide, which is usually a finite space. In order to insert large content (e.g., large text, detailed charts, process maps) greater than the size of the slide, the large content is usually resized or manually divided into smaller portions. Each smaller portion can then be inserted into a separate slide. Downsizing the large content may decrease the quality (e.g., the resolution) of the content. Dividing the content into smaller portions may be time-consuming and require the use of separate editing software. Also, some file types, such as detailed charts and spreadsheets, may not be amenable to a division without entirely recreating the file.

Further, conventional presentation applications are generally not capable of handling interactive content, such as websites and demonstrations, without launching an external program. Launching an external program may cause a new window to open and disrupt the linear presentation flow of the slideshow.

It is with respect to these considerations and others that the disclosure made herein is presented.

SUMMARY

Technologies are described herein for providing a non-linear presentation canvas. In particular, through the utilization of the technologies and concepts presented herein, a user can generate a presentation by inserting multimedia files, documents, hyperlinks, text, and nested workspaces onto a non-linear presentation canvas, which provides a virtually infinite workspace. Like the presentation canvas, each nested workspace also provides a virtually infinite workspace onto which additional objects may be inserted. Further, nested workspaces may be embedded within other nested workspaces to a virtually infinite degree to create layers of workspaces.

According to one aspect presented herein, a computer program provides a non-linear presentation canvas. The non-linear presentation canvas is a virtual space onto which documents, text, multimedia files, hyperlinks, and other data can be placed. The computer program further displays content previews corresponding to the objects inserted onto the non-linear presentation canvas. The content previews are selectable to display the corresponding objects.

According to embodiments, the non-linear presentation canvas is infinitely zoomable and panable in a smooth and seamless manner. In particular, the computer program provides functionality for smoothly zooming into and out of the non-linear presentation canvas, documents, multimedia files, text, hyperlinks, and nested workspaces placed thereupon. Further, the computer program provides functionality for allowing a user to pan over the non-linear presentation canvas.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is a diagram showing an illustrative configuration of the non-linear presentation canvas including a navigation menu and a workspace, in accordance with one embodiment;

DETAILED DESCRIPTION

The following detailed description is directed to technologies for providing a non-linear presentation canvas. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
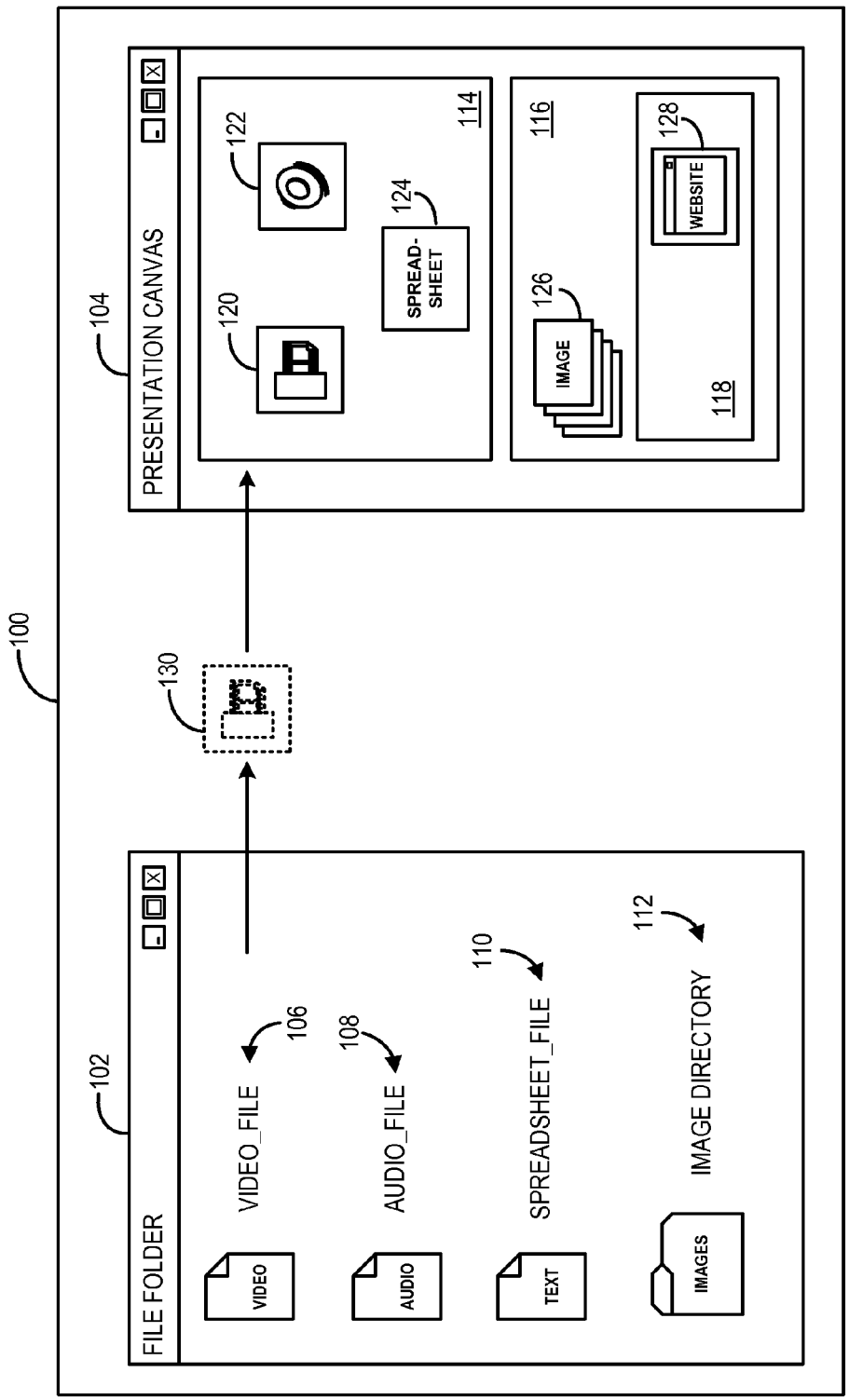
FIG. 1 is a screen display diagram showing an illustrative screenshot that includes a file folder and a non-linear presentation canvas, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a non-linear presentation canvas will be described. In particular, FIG. 1 shows an illustrative screenshot 100 of a file folder 102 and a non-linear presentation canvas (hereinafter referred to as "presentation canvas") 104. The file folder 102 is a standard file folder such as those provided by most modern operating systems, such as WINDOWS from MICROSOFT CORPORATION, MAC OS X from APPLE INC., and LINUX. As shown in FIG. 1, the file folder 102 includes a number of multimedia files stored therein, such as a video file 106, an audio file 108, and a spreadsheet file 110. The file folder 102 also includes an image folder 112 that contains images (not shown).

The presentation canvas 104 is a virtually infinite space onto which documents, text, multimedia files, hyperlinks, nested workspaces, and other types of objects can be inserted. The presentation canvas 104 includes a first nested workspace 114, a second nested workspace 116, and a third nested workspace 118. The third nested workspace 118 is embedded within the second nested workspace 116. Each of the nested workspaces 114-118 also includes a virtually infinite space in which multimedia files, hyperlinks, and nested workspaces can be inserted.

The first nested workspace 114 includes a video content preview 120, an audio content preview 122, and a spreadsheet content preview 124. In an illustrative example, the video content preview 120 is a graphical representation of the video file 106. For example, the video content preview 120 may be a screen capture from the video file 106. The audio content preview 122 is a graphical representation of the audio file 108. For example, the audio content preview 122 may include the title of a song included in the audio file 108 or a graphical waveform representation of the audio file 108. The spreadsheet content preview 124 is a graphical representation of the spreadsheet file 110. For example, the spreadsheet content preview 124 may include a rendering of a portion of the spreadsheet file 110.

The second nested workspace 116 includes an image stack content preview 126, and the third nested workspace 118 includes a website content preview 128. The image stack content preview 126 is a graphical representation of the images contained in the image folder 112. The website content preview 128 is a graphical representation of given hyperlink. For example, the website content preview 128 may be a screen capture of a website corresponding to the given hyperlink. It should be appreciated that the stack content preview may be also be utilized to represent multiple hyperlinks or a plurality of other types of multimedia files.

The multimedia files, hyperlinks, and other objects may be inserted onto the presentation canvas 104 in any suitable manner. As previously mentioned, a content preview representing the underlying inserted multimedia file or hyperlink may be displayed on the presentation canvas 104. The content preview may be moved, oriented, and resized in any suitable manner. In one embodiment, the content preview is a live preview of the underlying multimedia file or hyperlink. In other embodiments, the content preview may also be an icon or other suitable pre-rendered image.

In one embodiment, a multimedia file is dragged onto the presentation canvas 104 via a suitable input device, such as a mouse, stylus, or touchpad. For example, as illustrated in FIG. 1, the video file 106 may be dragged from the file folder 102 onto the presentation canvas 104 as shown by the dotted representation 130 of the video file 106. Once the video file 106 is dragged into the presentation canvas 104, the presentation canvas 104 displays the video content preview 120 representing the video file 106. In another embodiment, a multimedia file is inserted onto the presentation canvas 104 via a file menu.

Figure 2A:
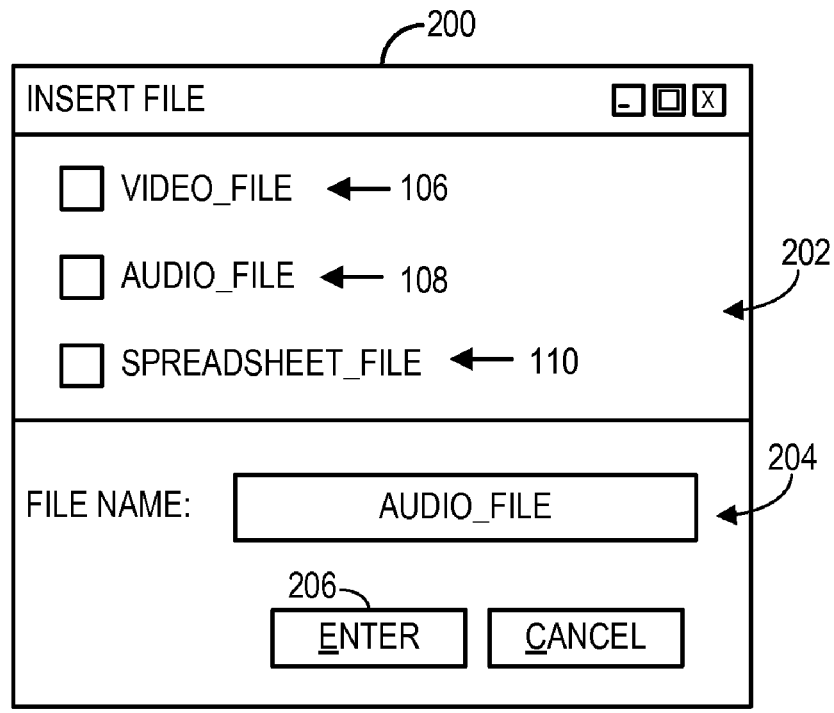
FIG. 2A is a screen display diagram showing an illustrative screenshot of a file menu for inserting multimedia files onto the non-linear presentation canvas, in accordance with one embodiment.

Turning now to FIG. 2A, an illustrative file menu 200 is shown, in accordance with one embodiment. Although not so illustrated, the presentation canvas 104 may include a selectable option for inserting a multimedia file via the file menu 200. As illustrated in FIG. 2A, the file menu 200 includes a directory portion 202 which includes a listing of a portion of the files in a given directory. The directory portion 202 displays the video file 106, the audio file 108, and the spreadsheet file 110. The file menu 200 further includes a file name entry portion 204 where a user can input the name of a file. In an illustrative example, the name of the audio file 108 has been typed into the file name entry portion 204. Upon a user selecting an enter button 206, the presentation canvas 104 displays the audio content preview 122 representing the audio file 108, as illustrated in FIG. 1.

Figure 2B:
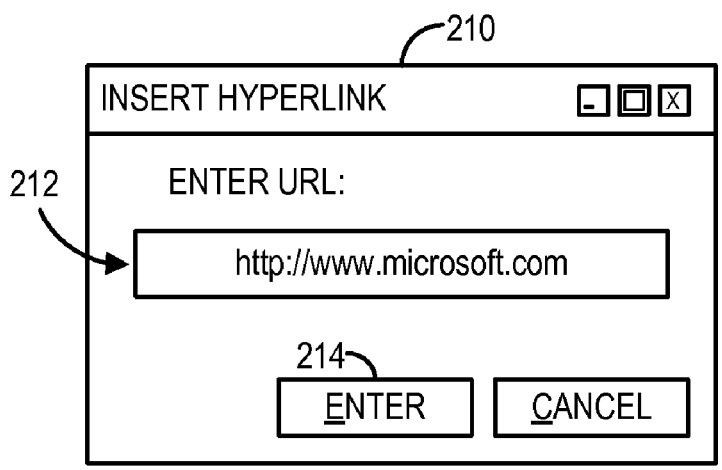
FIG. 2B is a screen display diagram showing an illustrative screenshot of a hyperlink menu for inserting hyperlinks onto the non-linear presentation canvas, in accordance with one embodiment.

In yet another embodiment, a hyperlink or other suitable remote link (e.g., a link to a remote file) may be inserted onto the presentation canvas 104. Turning now to FIG. 2B, an illustrative hyperlink menu 210 is shown, in accordance with one embodiment. Although not so illustrated, the presentation canvas 104 may include a selectable option for inserting a hyperlink via the hyperlink menu 210. As illustrated in FIG. 2B, the hyperlink menu 210 includes a uniform resource locator ("URL") entry portion 212 where a user can enter a hyperlink. In an illustrative example, the hyperlink "http://www.microsoft.com" is entered into the URL entry portion

212. Upon a user selecting an enter button 214, the presentation canvas 104 displays the website content preview 128 representing the hyperlink "http://www.microsoft.com." It should be appreciated that other methods for inserting multimedia files and hyperlinks may be similarly utilized. The insertion of nested workspaces is described in greater detail below with respect to FIGS. 4A-4C.

Referring again to FIG. 1, during a presentation, a user may zoom and pan across various portions of the presentation canvas 104 in a smooth and seamless manner. Upon reaching a desired portion of the presentation canvas 104, a user may select one of the content previews, such as the content previews 120-128 on the presentation canvas 104, to access the corresponding multimedia file or website. In particular, a user may select one of the content previews 120-128 via a suitable input device. In one example, selecting the video content preview 120 accesses an embedded video player for playing video file 106.

Figure 3A:
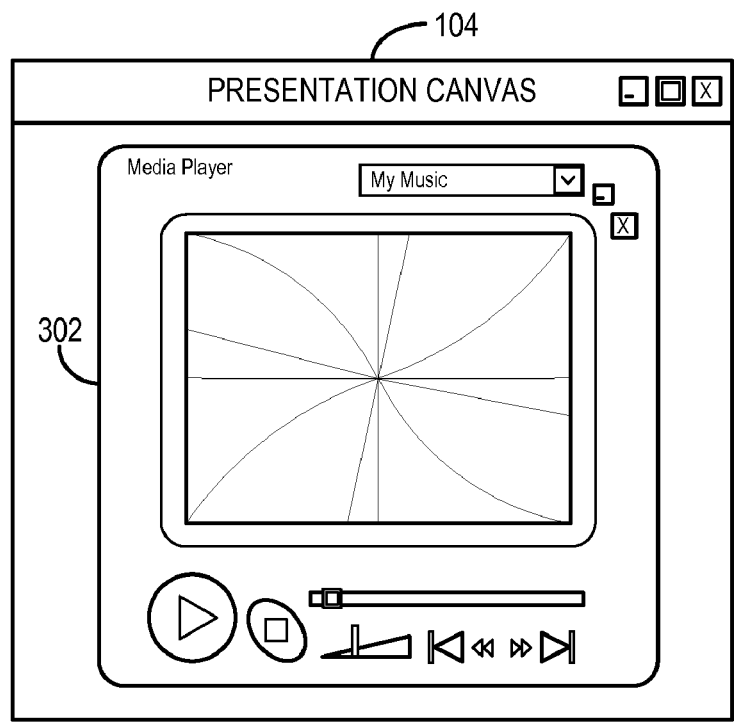
FIG. 3A is a screen display diagram showing an illustrative screenshot of a video player embedded in the non-linear presentation canvas, in accordance with one embodiment.

Turning now to FIG. 3A, an exemplary embedded video player 302 adapted to play the video file 106 is shown, in accordance with one embodiment. The embedded video player 302 is opened within the presentation canvas 104, eliminating the need to open an external video player, such as WINDOWS MEDIA PLAYER from MICROSOFT CORPORATION, QUICKTIME from APPLE INC., and REALPLAYER from REALNETWORKS INC. The embedded video player 302 may be resized to fill a portion of the screen or the entire screen.

Figure 3B:
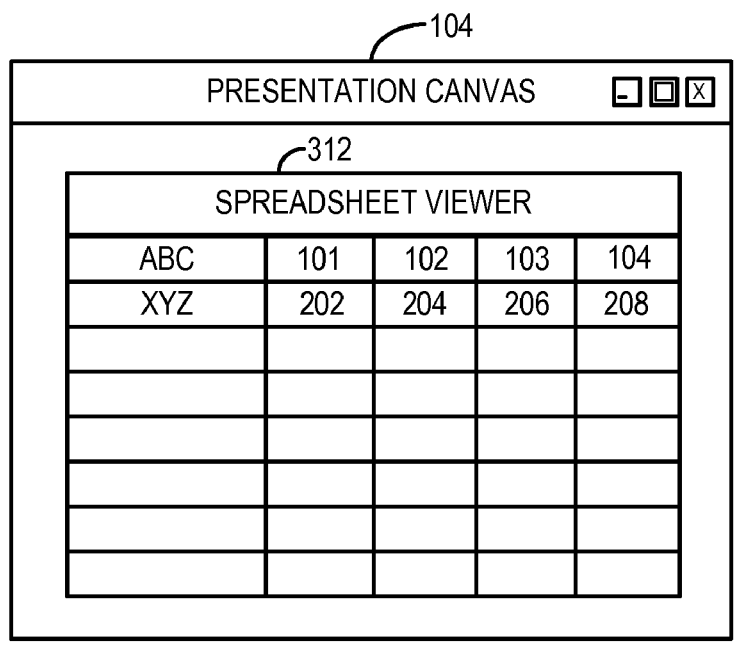
FIG. 3B is a screen display diagram showing an illustrative screenshot of a spreadsheet viewer embedded in the non-linear presentation canvas, in accordance with one embodiment.

In a second example, selecting the spreadsheet content preview 124 accesses an embedded spreadsheet viewer for viewing the spreadsheet file 110. Turning now to FIG. 3B, an exemplary embedded spreadsheet viewer 312 adapted to display the spreadsheet file 110 is shown, in accordance with one embodiment. The embedded spreadsheet viewer 312 is opened within the presentation canvas 104, eliminating the need to open an external spreadsheet program, such as EXCEL from MICROSOFT CORPORATION and LOTUS 1-2-3 from INTERNATIONAL BUSINESS MACHINES CORPORATION. The embedded spreadsheet viewer 312 may be resized to fill a portion of the screen or the entire screen.

Figure 3C:
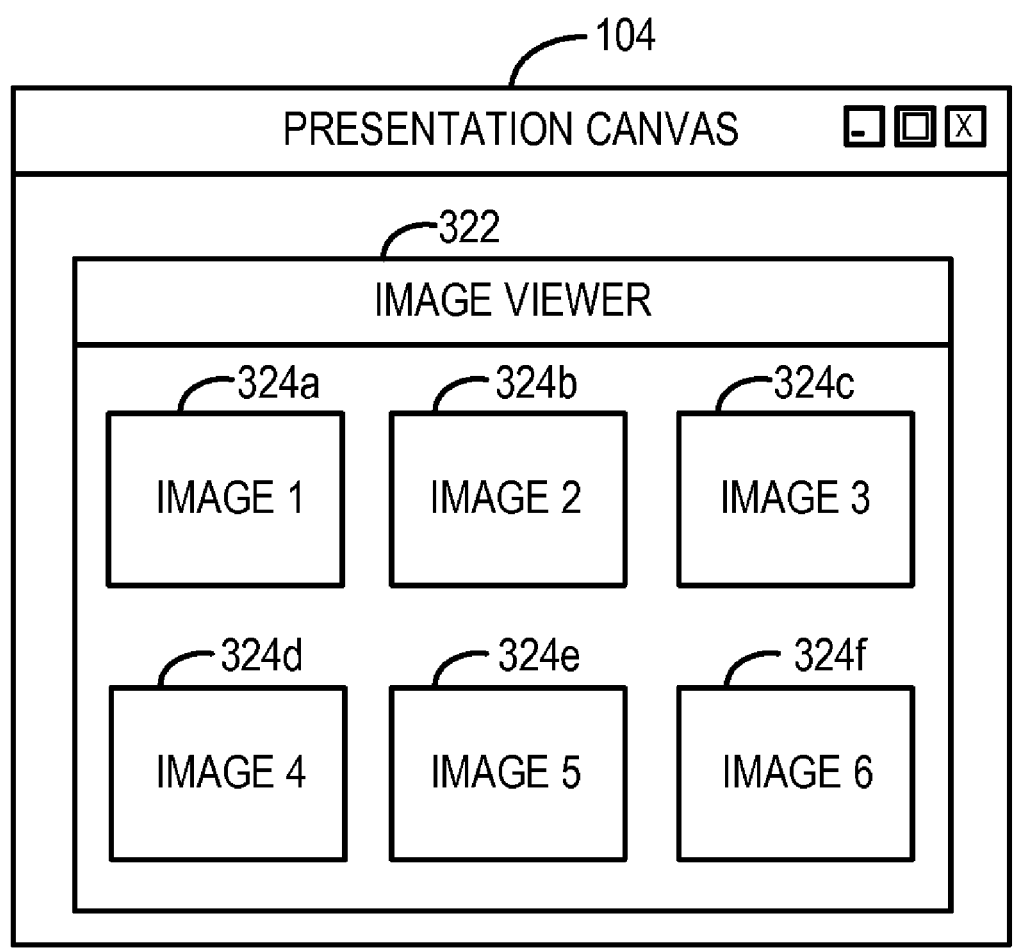
FIG. 3C is a screen display diagram showing an illustrative screenshot of an image viewer embedded in the non-linear presentation canvas, in accordance with one embodiment.

In a third example, selecting the image stack content preview 126 of FIG. 1 accesses an embedded image viewer for viewing a plurality of image files corresponding to the image stack content preview 126. Turning now to FIG. 3C, an exemplary embedded image viewer 322 adapted to display the plurality of image files is shown, in accordance with one embodiment. The embedded image viewer 322 is opened within the presentation canvas 104, eliminating the need to open an external image program, such as WINDOWS PICTURE AND FAX VIEWER from MICROSOFT CORPORATION and PREVIEW from APPLE INC.

As shown in FIG. 3C, the embedded image viewer 322 displays a plurality of thumbnail images 324a-324f. By selecting one of the thumbnail images 324a-324f, a user can view the actual corresponding image. The embedded image viewer 322 may be resized to fill a portion of the screen or the entire screen. A user may also zoom into the thumbnail images to generate a larger view of the corresponding image.

Figure 3D:
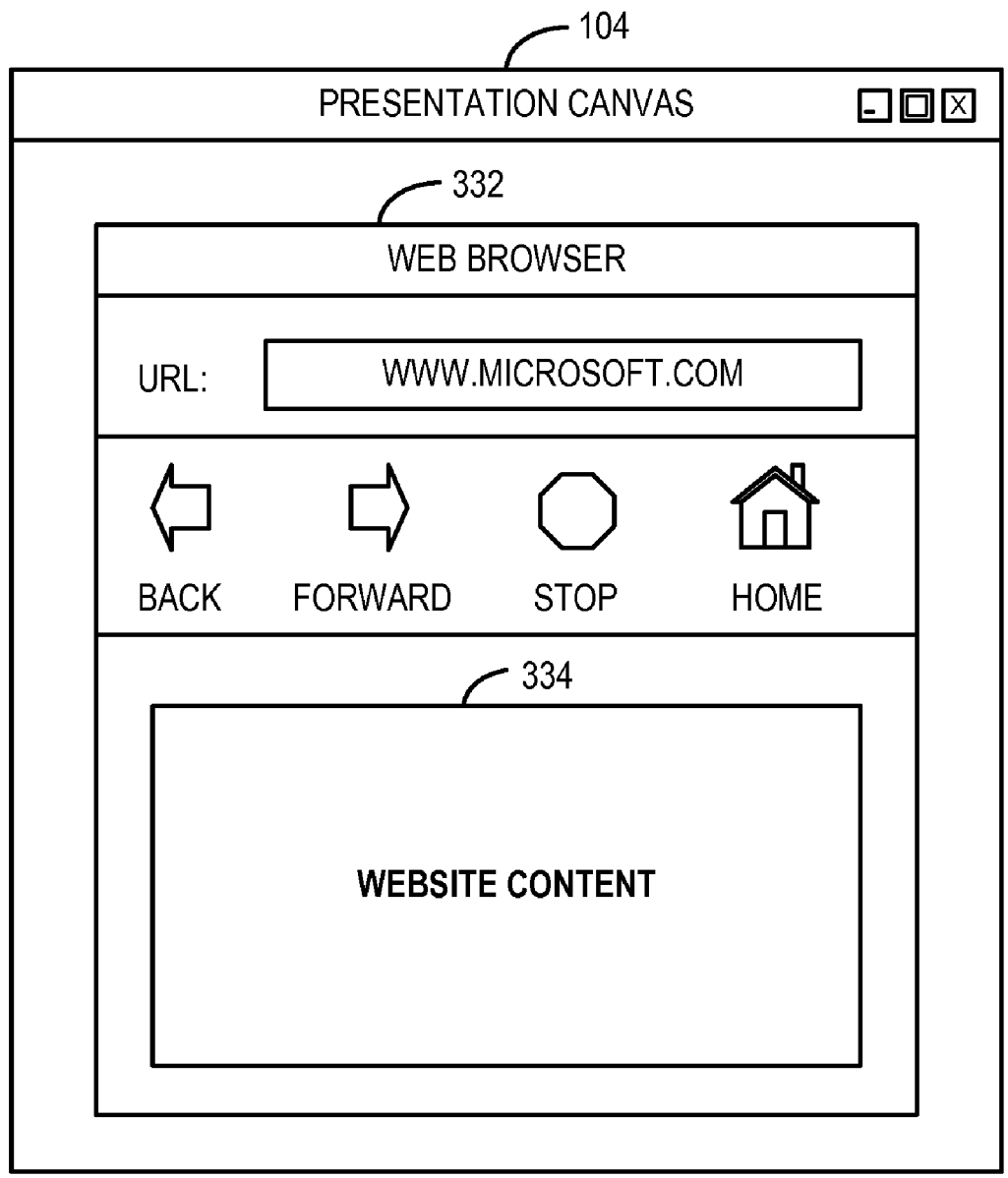
FIG. 3D is a screen display diagram showing an illustrative screenshot of a web browser embedded in the non-linear presentation canvas, in accordance with one embodiment.

In a fourth example, selecting the website content preview 128 of FIG. 1 accesses an embedded web browser for viewing a hyperlink corresponding to the website content preview 128. Turning now to FIG. 3D, an embedded web browser 324 adapted to display the hyperlink is shown, in accordance with one embodiment. The embedded web browser 332 is opened within the presentation canvas 104, eliminating the need to open an external web browser, such as INTERNET EXPLORER from MICROSOFT CORPORATION, FIREFOX from MOZILLA CORPORATION, and SAFARI from APPLE INC. As illustrated in FIG. 3D, the embedded web browser 332 displays web content 334 from the hyperlink "http://www.microsoft.com." The embedded web browser 324 may be resized to fill a portion of the screen or the entire screen.

By directly embedding the multimedia viewers, such as the video player 302, the spreadsheet viewer 312, the image viewer 322, and the web browser 324, into the presentation canvas 104, the flow of a given presentation is not interrupted by opening an external software program. To increase the speed of opening these embedded multimedia viewers, the functionality provided by the multimedia viewers may be directly integrated into the application program executing the presentation canvas 104.

In one embodiment, each of the content previews 120-128 is embodied in a low resolution image, such as a mipmap. The low resolution image minimizes the amount of data held in memory at a given time. This enables larger portions of the presentation canvas 104 and multiple content previews to be efficiently displayed. When a user selects one of the content previews 120-128 to access the underlying multimedia file or zooms into one of the content previews 120-128, the application program may call a higher resolution image or the multimedia file into memory and swap the higher resolution image or the multimedia file with the content previews in memory at that time. For larger multimedia files, the application program may call into memory only the relevant portion of the multimedia file that is currently displayed, thereby enabling the display of large text documents, spreadsheets, diagrams, charts, and the like. The application program may seamlessly transition between the low resolution images and the multimedia files in order to provide smooth zooming and panning of the presentation canvas 104 and the multimedia files inserted thereon.

In one embodiment, the presentation canvas 104 operates in one or more different modes. For example, the presentation canvas 104 may operate in a build mode, an annotate mode, and a present mode. The build mode may represent a mode in which documents, text, multimedia files, hyperlinks, nested workspaces, and other objects can be inserted into the presentation canvas 104. The annotate mode may represent a mode in which the presenter or another user can annotate the presentation canvas 104 with comments or other annotations. The present mode may represent a mode in which the multimedia files, hyperlinks, and nested workspaces inserted into the presentation canvas can be accessed and displayed during a presentation.

Turning now to FIG. 4A, an exemplary configuration of the user interface 400 utilized within the presentation canvas 104 is shown, in accordance with one embodiment. The user interface 400 includes a navigation menu 402 and workspace 404. The navigation menu 402 may include a variety of selectable options that a user can utilize to interact with the workspace 404. As discussed above, in one embodiment the workspace 404 comprises virtually infinite space onto which documents, text, multimedia files, hyperlinks, nested workspaces, and other objects may be placed. In particular, the user may utilize the navigation menu 402 to insert multimedia files, hyperlinks, and nested workspaces onto the workspace 404. It should be appreciated that the navigation menu 402 may be positioned within the user interface 400 in a variety of other ways, as contemplated by those skilled in the art. Also, the navigation menu 402 may be hidden until the user chooses to access it.

Figure 4B:
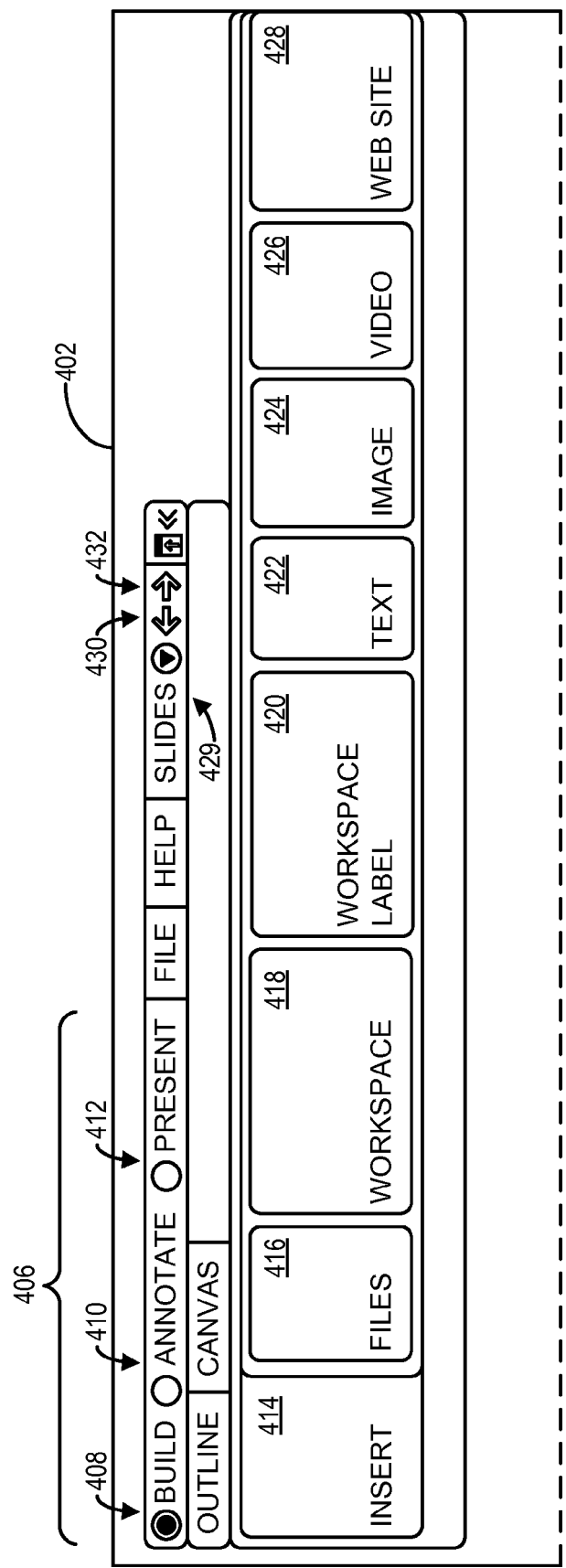
FIG. 4B is an illustrative diagram of the navigation menu, in accordance with one embodiment.

Turning now to FIG. 4B, a more detailed view of the navigation menu 402 is shown, in accordance with one embodiment. The navigation menu 402 includes a mode selection function 406, which includes a build mode 408, and an annotate mode 410, and a present mode 412. As illustrated in FIG. 4B, the build mode 408 has been selected. In one embodiment, the build mode 408 refers to a mode in which multimedia files, hyperlinks, and nested workspaces can be inserted onto workspace 404. The annotate mode 410 refers to a mode in which annotations can be added to the workspace 404 to supplement the content previews displayed on the workspace 404. The present mode 412 refers to a mode in which the contents of the workspace 404 may be accessed for display during a presentation.

The navigation menu 402 further includes an insert menu 414, which when selected provides a number of different functions for inserting multimedia files, hyperlinks, and nested workspaces onto the workspace 404. In particular, the insert menu 414 includes a files function 416, a workspace function 418, a workspace label function 420, a text function 422, an image function 424, a video function 426, and a website function 428. The functions 416-428 illustrated in FIG. 4B are merely exemplary and other functions for inserting multimedia files, hyperlinks, and nested workspaces onto the workspace 404 may be similarly utilized.

In one embodiment, the files function 416 enables a user to insert one or more presentation files into the workspace 404 via a file menu. For example, the user may utilize the files function 416 to insert presentation templates or previously-created presentation slides. The workspace function 418 enables the user to insert a nested workspace onto the workspace 404, and the workspace label function 420 enables the user to label the nested workspace. Nested workspaces are described in greater detail below with respect to FIG. 4C.

The text function 422 enables the user to insert one or more word processing files onto the workspace 404. The text function 422 may also enable the user to manually enter text onto the workspace 404. The image function 424 enables the user to insert one or more image files onto the workspace 404, and the video function 426 enables the user to insert one or video files onto workspace 404. In one embodiment, the text function 422, the image function 424, and the video function 426 include additional configuration functions to format and orient the inserted text, images, and videos, respectively. For example, the image function 424 may include configuration functions for sizing the displayed image or formatting the manner in which the image is displayed during a presentation. The website function 428 enables the user to enter a hyperlink.

In one embodiment, the navigation menu 402 includes a snapshot capture item 429 for capturing instances (referred to herein as "snapshots") of the presentation canvas as displayed at a given time. For instance, the current zoom level and pan location may be recorded as a snapshot. In one embodiment, the snapshots can be ordered in a linear sequence and displayed in a similar manner as slides in conventional presentation applications. Each snapshot is essentially a predefined starting part that can be used during a presentation. In one embodiment, the snapshots are interactive in the same manner as directly interacting with the presentation canvas 104. For example, if a given snapshot shows the first nested workspace 144, then a user select the video content preview 120 via the snapshot to access the video file 106.

In an illustrative example, selection of the snapshot capture item 429 will cause a menu (not shown) to be displayed that includes a number of functions for creating and arranging the snapshots. When in the present mode 412, the user may utilize a back button 430 and a forward button 432 to navigate between previous snapshots and subsequent snapshots, respectively, in a linear sequence.

Figure 4C:
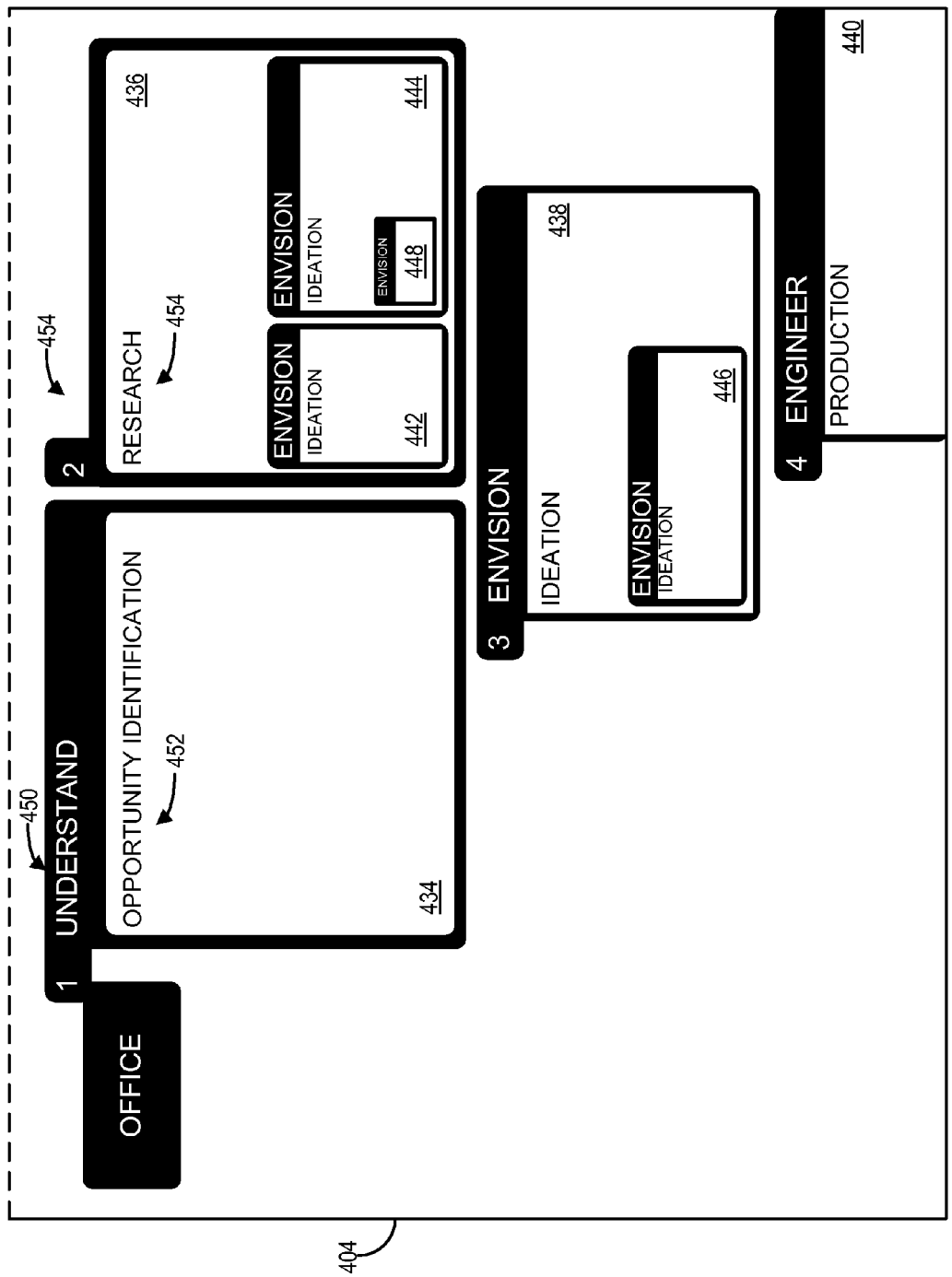
FIG. 4C is an illustrative diagram of the workspace, in accordance with one embodiment.

Turning now to FIG. 4C, a more detailed view of the workspace 404 is shown, in accordance with one embodiment. The illustrative workspace 404 shown in FIG. 4C includes a number of illustrative nested workspaces. In particular, the workspace 404 includes a first nested workspace 434, a second nested workspace 436, a third nested workspace 438, and a fourth nested workspace 440. Within the second nested workspace 436 is a fifth nested workspace 442 and a sixth nested workspace 444, and within the third nested workspace 438 is seventh nested workspace 446. Within the sixth nested workspace 444 is an eighth nested workspace 448.

As previously mentioned, the workspace function 418 may be selected to insert the nested workspaces 434-448. Likewise, the workspace label function 420 may be selected to provide labels for the nested workspaces 434-448. In one embodiment, each nested workspace 434-448 includes an outer label and an inner label. The outer label may be placed along a tab of the nested workspaces 434-448. The inner label may be placed within the nested workspaces 434-448. In one example, the first nested workspace 434 includes an outer label 450 stating "understand" and an inner label 452 stating "opportunity identification." In another example, the second nested workspace 436 includes an outer label 454 that is blank, and the inner label 456 stating "label."

Like the workspace 404, each of the nested workspaces 434-448 includes a virtually unlimited space in which a user can insert multimedia files, hyperlinks, and additional nested workspaces. The nested workspaces 434-448 may be moved, oriented, and resized in any suitable manner within the workspace 404. In one embodiment, selecting one of the nested workspaces 434-448 causes the selected nested workspace to enlarge on the screen. For example, clicking on the tab containing the outer label 450 may cause the first nested workspace 434 to enlarge, thereby enabling the user to better view the content previews and nested workspaces contained in the first nested workspace 434.

The nested workspaces 434-448 may be utilized to organize content previews and other nested workspaces. For example, video files may be inserted into a nested workspace labeled as "video," and audio files may be inserted into a nested workspace labeled as "audio." Additional nested workspaces may be included to further organize the inserted video and audio files. For example, the nested workspace labeled "video" may include a nested workspace labeled "advertising" for promotional videos and another nested workspace labeled "training" for employee training videos. During a presentation, a user can seamlessly and intuitively access a variety of multimedia files and hyperlinks during a presentation by navigating the nested workspaces 434-448 and utilizing the zooming and panning functionality.

Figure 5A:
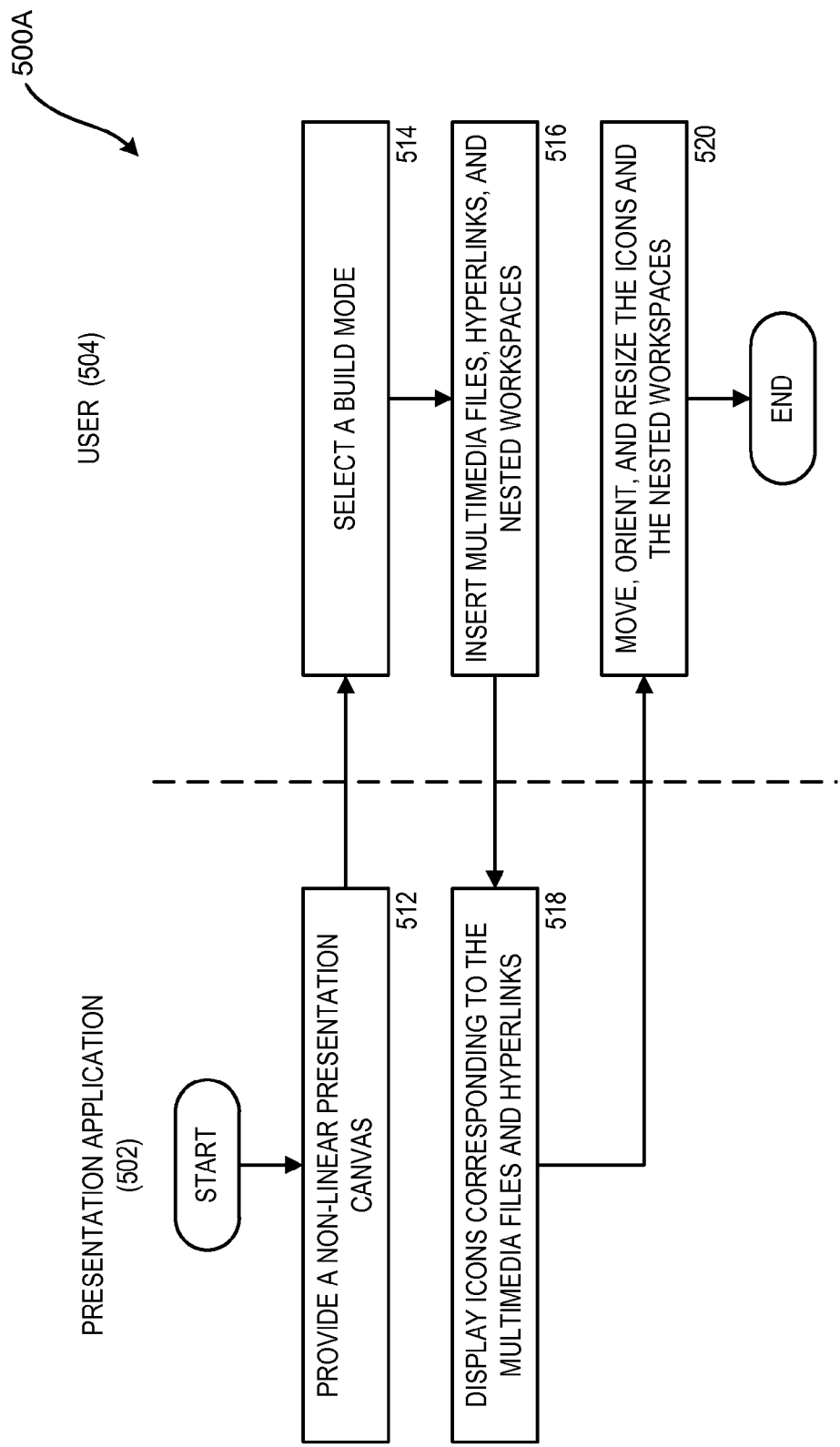
FIGS. 5A and 5B are flow diagrams showing aspects of an illustrative process for interacting with the non-linear presentation canvas, in accordance with one embodiment.
Figure 5B:
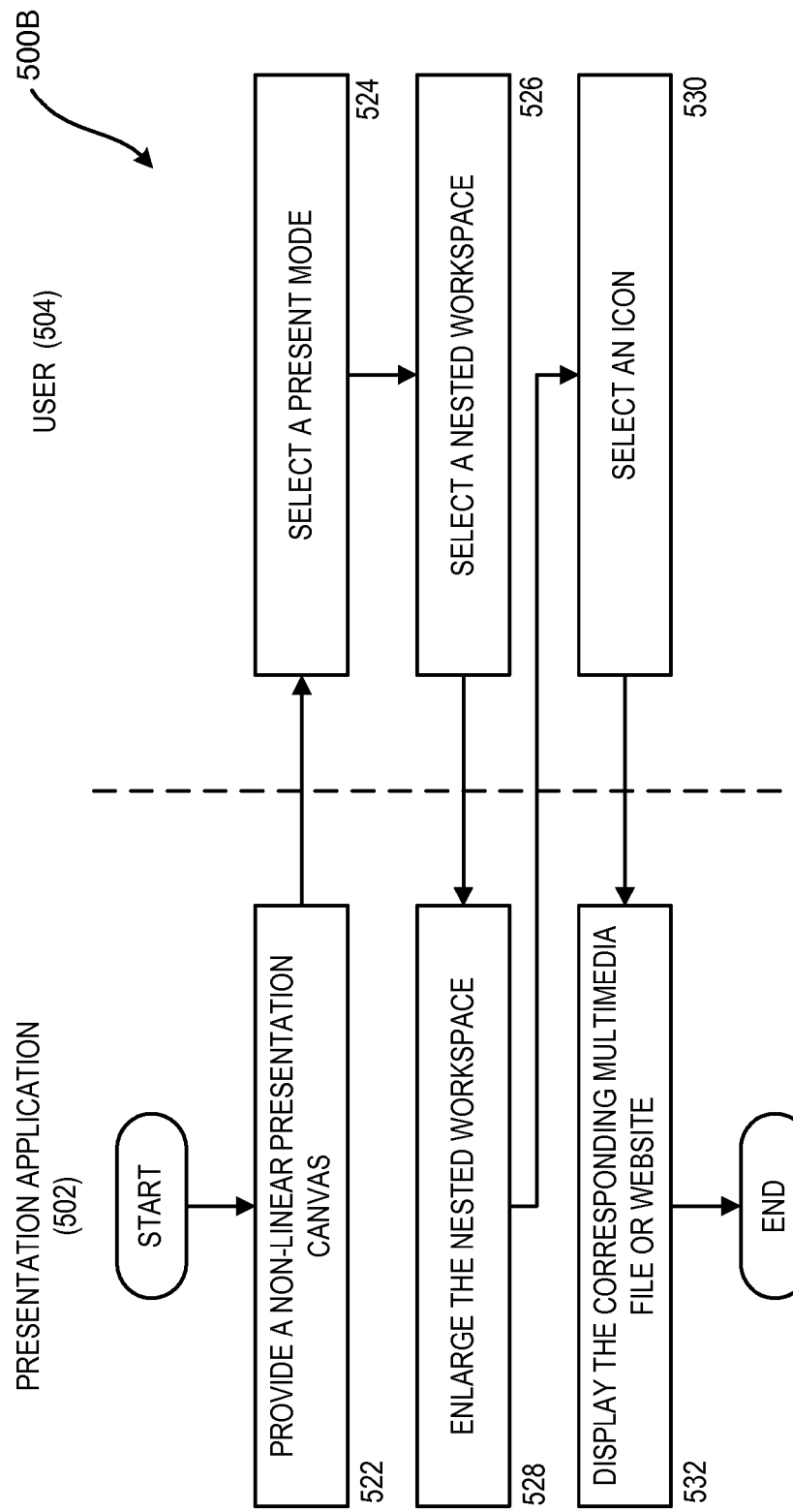

Referring now to FIGS. 5A and 5B, additional details will be provided regarding the embodiments presented herein for providing a non-linear presentation canvas, such as the presentation canvas 104. In particular, FIG. 5A is a flow diagram illustrating aspects of one method provided herein for interacting with the presentation canvas 104 during the build mode 408. Further, FIG. 5B is a flow diagram illustrating aspects of one method provided herein for interacting with the presentation canvas 104 during the present mode 412.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5A, a routine 500a begins at operation 512, where a non-linear presentation application 502 provides a presentation canvas, such as the presentation canvas 104, to a user 504. At operation 514, upon receiving the presentation canvas 104, the user 504 selects the build mode 408 enabling the user 504 to insert multimedia files, hyperlinks, and nested workspaces. At operation 516, once the presentation canvas 104 is in the build mode, the user 504 may insert a variety of multimedia files, hyperlinks, and nested workspaces onto the presentation canvas 104.

The routine 500a continues to operation 518, where the non-linear presentation application 502 displays content previews corresponding to the inserted multimedia files and hyperlinks. The non-linear presentation application 502 may also display the inserted nested workspaces. At operation 520, the user 504 moves, orients, and resizes the content previews and nested workspaces in any desired manner.

Referring to FIG. 5B, a routine 500b begins at operation 522, where the non-linear presentation application 502 provides a presentation canvas, such as the presentation canvas 104 to the user 504. At operation 524, upon receiving the presentation canvas 104, the user 504 selects the present mode 510 enabling the user 504 to access multimedia files and websites inserted onto the presentation canvas 104.

The routine 500b continues to operation 526 where the user 504 selects a nested workspace via a suitable input device. For example, the user 504 may click on the tab of the nested workspace to select the nested workspace. At operation 528, in response to receiving the selection of the nested workspace, the non-linear presentation application 502 displays an enlarged view of the selected nested workspace. Additional functionality may be provided to zoom in and out of the nested workspace, as well as to pan across various portions of the nested workspace.

The routine 500b continues to operation 530 where the user 504 selects a content preview via a suitable input device. For example, the user 504 may click on the content preview to access the corresponding multimedia file or website. At operation 532, in response to receiving the selection of the content preview, the non-linear presentation application 502 displays the corresponding multimedia file or website. In one embodiment, the multimedia file or website is displayed using the non-linear presentation application 502 without the need to access an external multimedia player or web browser.

Figure 6:
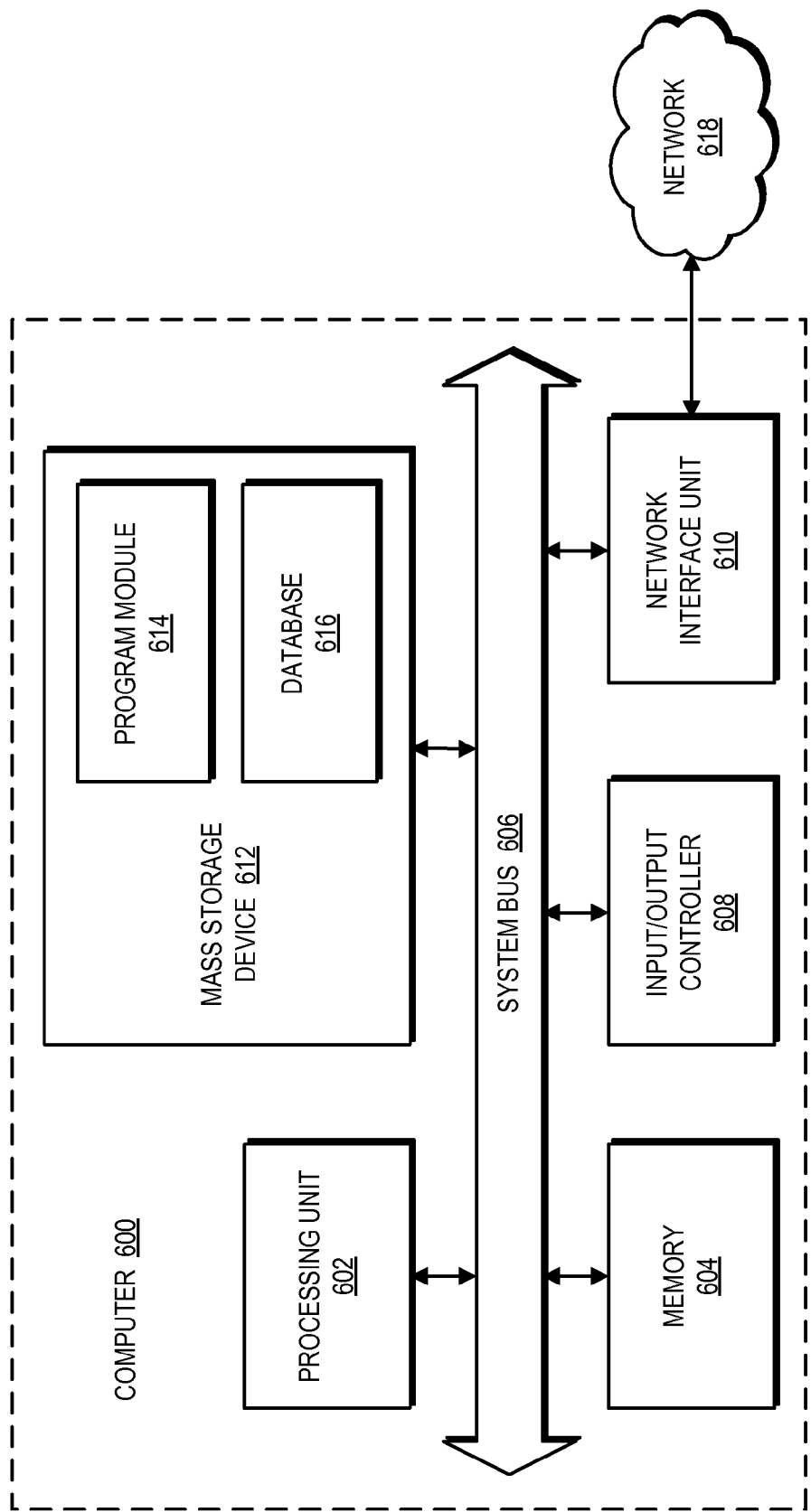
FIG. 6 is a computer architecture diagram showing aspects of an illustrative computer hardware architecture for a computing system capable of implementing aspects of the embodiments presented herein.

Referring now to FIG. 6, an exemplary computer architecture diagram showing aspects of a computer 600 is illustrated. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. An example of the program module 614 is the non-linear presentation application 502. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

It should be appreciated that the smooth, continuous zooming functionality utilized in embodiments presented herein may be provided by adaptive rendering algorithms that allow for fluid and continuous transitions between resolutions by interpolating between stored resolutions to arrive at the requested resolution in a fluid, continuous manner. One such algorithm is described in U.S. Pat. No. 7,075,535, entitled "System and Method for Exact Rendering in a Zooming User Interface," which was filed Mar. 1, 2004 and which is assigned to the assignee of the instant patent application and expressly incorporated herein by reference in its entirety.

Based on the foregoing, it should be appreciated that technologies for providing a non-linear presentation canvas are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable medium having computer-executable instructions stored thereon which, when executed by a computer, cause the computer to:

provide a non-linear presentation canvas, the non-linear presentation canvas comprising a virtual space onto which multimedia files and hyperlinks are inserted; and
display a content preview for one or more of the multimedia files and hyperlinks inserted onto the non-linear presentation canvas, the content preview being selectable to display the corresponding multimedia files and hyperlinks during a presentation.

2. The computer-readable medium of claim 1 having further computer-executable instructions stored thereon which, when executed by the computer, cause the computer to provide a nested workspace function for inserting a nested workspace onto the non-linear presentation canvas, the nested workspace providing another virtual space onto which the multimedia files and the hyperlinks are inserted.

3. The computer-readable medium of claim 2 having further computer-executable instructions stored thereon which, when executed by the computer, cause the computer to:
receive a selection of the nested workspace via an input device; and
enlarge the nested workspace in response to receiving the selection of the nested workspace.

4. The computer-readable medium of claim 2 having further computer-executable instructions stored thereon which, when executed by the computer, cause the computer to provide a formatting function for moving, orienting, and sizing the nested workspace on the non-linear presentation canvas.

5. The computer-readable medium of claim 2 having further computer-executable instructions stored thereon which, when executed by the computer, cause the computer to provide a labeling function for labeling the nested workspace.

6. The computer-readable medium of claim 1 having further computer-executable instructions stored thereon which, when executed by the computer, cause the computer to:
receive a selection of the content preview via an input device; and
swap the content preview in memory with the corresponding multimedia files in response to receiving the selection of the content preview.

7. The computer-readable medium of claim 1 having further computer-executable instructions stored thereon which, when executed by the computer, cause the computer to:
receiving a selection of the content preview via an input device; and
call a portion of the corresponding multimedia files being displayed into memory in response to receiving the selection of the content preview.

8. The computer-readable medium of claim 1, wherein the content preview comprises a low-resolution image of at least a portion of the corresponding multimedia files and hyperlinks.

9. The computer-readable medium of claim 8, wherein the low-resolution image comprises a mipmap.

10. The computer-readable medium of claim 1 having further computer-executable instructions stored thereon which, when executed by the computer, cause the computer to:
provide a zooming function for zooming within the non-linear presentation canvas and the corresponding multimedia files and hyperlinks; and
provide a panning function for panning across portions of the non-linear presentation canvas and the corresponding multimedia files and hyperlinks.

11. The computer-readable medium of claim 10 having further computer-executable instructions stored thereon which, when executed by the computer, cause the computer to:
receive an instruction via the zooming function to zoom from a first resolution of the corresponding multimedia files to a second resolution of the corresponding multimedia files; and
in response to receiving the instruction, swap a first mipmap in memory with a second mipmap, the first mipmap corresponding to the first resolution, the second mipmap corresponding to the second resolution.

12. The computer-readable medium of claim 10 having further computer-executable instructions stored thereon which, when executed by the computer, cause the computer to:
receive an instruction via the panning function to pan from a first portion of the corresponding multimedia files to a second portion of the corresponding multimedia files;
in response to receiving the instruction, swap the first portion in memory with the second portion.

13. The computer-readable medium of claim 1 having further computer-executable instructions stored thereon which, when executed by the computer, cause the computer to provide a snapshot capture function for capturing a displayed portion of the non-linear presentation canvas and for ordering a plurality of displayed portions in a linear sequence for display during the presentation.

14. The computer-readable medium of claim 13 having further computer-executable instructions stored thereon which, when executed by the computer, cause the computer to:
provide a back function for displaying a previous displayed portion in the linear sequence; and
provide a forward function for displaying a subsequent displayed portion in the linear sequence.

15. The computer-readable medium of claim 1 having further computer-executable instructions stored thereon which, when executed by the computer, cause the computer to provide a formatting function for moving, orienting, and sizing the content preview on the non-linear presentation canvas.

16. The computer-readable medium of claim 1 having further computer-executable instructions stored thereon which, when executed by the computer, cause the computer to provide a mode function for choosing between a build mode, an annotate mode, and a present mode,
the build mode enabling an insertion of the corresponding multimedia files and hyperlinks onto the non-linear presentation canvas,
the annotate mode enabling an insertion of annotations onto the non-linear presentation canvas to supplement the content preview displayed on the non-linear presentation canvas,
the present mode enabling a display of the corresponding multimedia files and hyperlinks in response to receiving a selection of the content preview via an input device.

17. The computer-readable medium of claim 1 having further computer-executable instructions stored thereon which, when executed by the computer, cause the computer to:
receive a selection of the content preview; and
in response to receiving the selection of the content preview, display the corresponding multimedia files and hyperlinks within the non-linear presentation canvas without executing an external application program.

* * * * *